US012189636B2

(12) United States Patent
An et al.

(10) Patent No.: US 12,189,636 B2
(45) Date of Patent: Jan. 7, 2025

(54) RISK ANALYSIS SYSTEM AND METHOD

(71) Applicant: ZHIJIA TECHNOLOGY (BEIJING) CO., LTD., Beijing (CN)

(72) Inventors: Yongliang An, Beijing (CN); Rong Xie, Beijing (CN); Zhuoya An, Beijing (CN)

(73) Assignee: Zhijia Technology (Beijing) Co. LTD, Beijing (CN)

( * ) Notice: Subject to any disclaimer, the term of this patent is extended or adjusted under 35 U.S.C. 154(b) by 0 days.

(21) Appl. No.: 18/025,860

(22) PCT Filed: Sep. 14, 2021

(86) PCT No.: PCT/CN2021/118131
§ 371 (c)(1),
(2) Date: Mar. 10, 2023

(87) PCT Pub. No.: WO2022/062955
PCT Pub. Date: Mar. 31, 2022

(65) Prior Publication Data
US 2023/0350904 A1 Nov. 2, 2023

(30) Foreign Application Priority Data
Sep. 22, 2020 (CN) .......................... 202011000480.3

(51) Int. Cl.
G06F 16/00 (2019.01)
G06F 16/2457 (2019.01)
G06F 17/18 (2006.01)

(52) U.S. Cl.
CPC ........ G06F 16/24578 (2019.01); G06F 17/18 (2013.01)

(58) Field of Classification Search
CPC .................................................. G06F 16/24578
See application file for complete search history.

(56) References Cited

U.S. PATENT DOCUMENTS 10,866,783 B2 * 12/2020 Atarot .................... A41D 13/11
2013/0257622 A1 * 10/2013 Davalos .................... F16P 3/14
340/5.6
(Continued)

FOREIGN PATENT DOCUMENTS

CN 105204413 12/2015
CN 105530305 4/2016
(Continued)

OTHER PUBLICATIONS

Chinese Office Action (including English translation) issued in App. No. CN202011000480, dated May 20, 2024, 19 pages.
(Continued)

Primary Examiner — Noosha Arjomandi
(74) Attorney, Agent, or Firm — Blueshift IP; Robert Plotkin

(57) ABSTRACT

The present invention discloses a risk analysis system and a risk analysis method, which comprises at least one intelligent wearable kit, terminal device connected with intelligent wearable kit and server; The intelligent wearable kit collects at least one kind of first risk information of the user, and sends at least one kind of first risk information to the connected terminal device; The terminal device makes statistics on the first risk information, sends the first risk statistics to the server, and receives the risk analysis results sent by the server; The server performs risk analysis based on at least one first risk information and statistics, and sends risk analysis results to terminal device. The invention collects risk information, and then determines the results of risk analysis through unified analysis and comprehensive assessment of big data, so as to achieve differentiated treatment on risk and provide a basis for intelligent protection, intelligent management, specific control, etc.

9 Claims, 6 Drawing Sheets

(56) References Cited

U.S. PATENT DOCUMENTS

| | | | |
|---|---|---|---|
| 2016/0120734 A1* | 5/2016 | Ishikawa | A61B 5/1116 224/259 |
| 2016/0259905 A1* | 9/2016 | Park | A61B 5/021 |
| 2017/0131769 A1* | 5/2017 | Keller | G06F 3/014 |
| 2017/0351840 A1* | 12/2017 | Goguen | G16H 40/67 |
| 2018/0049636 A1* | 2/2018 | Miller | A61B 3/10 |
| 2019/0012926 A1* | 1/2019 | Moss | G06Q 10/10 |
| 2020/0029635 A1* | 1/2020 | Kiemele | A41D 19/015 |
| 2020/0341550 A1* | 10/2020 | Giordano | G06F 3/014 |
| 2021/0145450 A1* | 5/2021 | Gruentzig | A61B 5/6803 |
| 2022/0187920 A1* | 6/2022 | Keller | G06F 3/011 |
| 2022/0246299 A1* | 8/2022 | Gilvert | G16H 40/67 |

FOREIGN PATENT DOCUMENTS

| | | |
|---|---|---|
| CN | 106056516 | 10/2016 |
| CN | 107334466 | 11/2017 |
| CN | 207667103 | 7/2018 |
| CN | 108597176 | 9/2018 |
| CN | 209514833 | 10/2019 |
| CN | 110430246 | 11/2019 |
| CN | 111464780 | 7/2020 |

OTHER PUBLICATIONS

International Search Report and Written Opinion issued in App. No. PCT/CN2021/118131, mailing date Dec. 14, 2021, 10 pages.

* cited by examiner

RISK ANALYSIS SYSTEM AND METHOD

CROSS-REFERENCE TO RELATED APPLICATIONS

This application claims priority to International Application No. PCT/CN2021/118131, filed on Sep. 14, 2021, which claims the priority benefit of China Patent Application No. 2020110004803, filed on Sep. 22, 2020. The contents of the above identified applications are incorporated herein by reference in their entirety.

FIELD OF THE TECHNOLOGY

The invention relates to technical domain of injury prevention, in particular to a risk analysis system and a risk analysis method.

BACKGROUND

Personal Protective Equipment (PPE) are widely used in various industries, such as coveralls, gloves, safety shoes, hard hat, etc. Their value is to reduce severity of injury in case of accidents. At present, most PPEs in the market are passive protection. When accidents happen, traditional PPE can only reduce severity of injury, and cannot prevent the injury or fundamentally reduce the possibility of injury.

At present, there are only a small number of smart PPE that can actively send out risk alerts. When detecting and sending risk alerts, it is limited to certain body part, and its function is relatively simple. It is impossible to carry out in-depth analysis and research on the risk information detected by smart PPE. Meanwhile, existing risk management system mainly rely on some traditional methods, such as training, process management, safety warning, conventional PPE, etc., which cannot systematically, comprehensively and automatically perform risk analysis and risk evaluation. Therefore, the existing risk control analysis and risk management system need to be improved.

SUMMARY

In view of the above problems, the present invention is proposed to provide a risk analysis system and a risk analysis method to overcome above problems or at least partially solve above problems.

Firstly, the embodiment of the invention provides a risk analysis system, which can include: at least one intelligent wearable kit, terminal device connected with the intelligent wearable kit, and server;

The intelligent wearable kit is used to collect at least one kind of the first risk information of user and send at least one kind of the first risk information to the connected terminal device;

The terminal device is used for sending the first risk information and statistics to server, and receiving risk analysis results sent by server;

The server is used to carry out risk analysis according to at least one of the first risk information and statistics, and send risk analysis results to the terminal device.

Optionally, statistics of the first risk information include:

Statistics are performed on the first risk information according to risk type, triggering time of risk and/or risk level.

Optionally, the risk analysis is carried out according to at least one of the first risk information and/or statistics, including:

Comparing total number of risks for all types in a unit time with at least one preset threshold of the first number of risks, and determine risk level for each time period according to the comparison results;

Ranking total number of risks for all types per unit time, and determine risk level for each time period according to the ranking results;

Comparing number of risk of different type in unit time with at least one second number of risk threshold set in advance, and determine risk level for risk types according to the comparison results; And/or, Ranking number of risk of different type in unit time, and determine risk level of risk types according to the ranking results.

Optionally, terminal device is also used to receive or record geographic location of intelligent wearable kit and send the geographic location to server when receiving at least one first risk information sent by the intelligent wearable kit;

Server is also used to determine risk level of each region in each time period according to the geographical location, preset region, as well as comparison results of number of all types of risk per unit time and at least one preset threshold of the third number of risk;

Determine risk level of each region in each time period according to the geographical location, preset region, and ranking results of number of all types of risk per unit time;

Determine risk level of risk type for each region according to the geographical location, preset region, as well as the comparison result between number of risk of different type in unit time and at least one preset threshold of the fourth number of risk; And/or, Determine risk level of risk type for each region according to the geographical location, preset area, as well as the ranking results of number of risk of different type in unit time.

Optionally, terminal device is also used to receive or record motion trail of intelligent wearable kit and send it to server;

Server is also used to associate and store the geographic location, motion trail and the first risk information, and/or generate and display the risk trail image.

Optionally, terminal device is also used to record working type of corresponding user of intelligent wearable kit;

Server is also used to carry out risk analysis according to the type of work and the first risk information and statistics, and determine analysis results of the specific type of work.

Optionally, terminal device is also used to record other information of the corresponding user of intelligent wearable kit; The other information includes any or a combination of the following information: the using time of the intelligent wearable kit, injury information and information on operation violation of the user; Server is also used for associate and storage the other information and the first risk information and statistics.

Optionally, terminal device is also used to record description of the first risk information when receiving at least one first risk information sent by intelligent wearable kit; The description includes any or more of the following information: reason for triggering the risk prompt, working status of the instrument and equipment, working environment and the method to avoid risk;

Server is also used for multi-dimensional analysis of the first risk information and statistics according to the description, and determine cause of the risk prompt; And/or, Associate and store the risk description with the first risk information.

Optionally, intelligent wearable kit is also used to receive at least one second risk information sent by other intelligent wearable kits, and send at least one second risk information to connected terminal device;

Terminal device is used to perform statistics on the second risk information and send the second risk information and statistics to server, And record the human intervention, and send the human intervention information to server;

Server is used to associate and store the second risk information, statistics and the human intervention information, and/or generate a risk intervention report based on the second risk information, statistics and the human intervention information.

Optionally, server is also used to input at least one of the first risk information into a selected machine learning model as a factor affecting occurrence of accidents, and predict probability of accident within the preset time period.

Secondly, the embodiment of the invention provides another risk analysis system, which can include: at least one intelligent wearable kit and server;

Intelligent wearable kit is used to collect at least one kind of the first risk information of users and send at least one kind of the first risk information to server;

Server is used for risk analysis based on at least one of the first risk information.

Thirdly, the embodiment of the invention provides a risk analysis method, which is applied to server, and can include:

Obtain at least one first risk information and statistics;

Conduct risk analysis on at least one of the first risk information and statistics;

Compare number of risks of all types in a unit time with at least one preset threshold of the first number of risk, and determine risk level for each time period according to the comparison results;

Rank number of risks for all types per unit time, and determine risk level for each time period according to the ranking results;

Compare number of risk of different type in unit time with at least one second number of risk threshold set in advance, and determine risk level for risk types according to the comparison results; And/or, Rank number of risk of different type in unit time, and determine risk level of risk types according to the ranking results.

Benefits of the above technical solution provided by the embodiment of the invention at least include:

The embodiment of the invention provides a risk analysis system and a risk analysis method, which includes at least one intelligent wearable kit, terminal device connected with intelligent wearable kit and server; The intelligent wearable kit is used to collect at least one kind of the first risk information of user and send at least one kind of first risk information to connected terminal device; The terminal device is used to perform statistics on the first risk information, send the first risk information and statistics to the server, and receive the risk analysis results sent by the server; Server is used to conduct risk analysis based on at least one first risk information and statistics and send the risk analysis results to the terminal device. The system provided by the embodiment of the invention obtains a large amount of risk data through collecting and analyzing of the first risk information, and then determines the results of risk analysis through comprehensive judgment of big data, so as to achieve differentiated treatment based on actual risk. Moreover, with the big data, we can comprehensively analyze the crux or vulnerability of risk management, providing a basis for intelligent protection, intelligent management, specific control, etc.

Other features and advantages of the invention will be described in subsequent descriptions, and become more apparent and understandable from the description or by implementing the invention. The intentions and other advantages of the invention can be understood and acquired by means of the description, the claims and the structures specifically pointed out in the drawings.

The following is a further detailed description of the technical scheme of the invention through the drawings, figures and examples.

BRIEF DESCRIPTION OF THE DRAWINGS

The figures are used to provide a further elaboration of the invention and form part of the specification. They are used to explain the invention together with embodiments of the invention, and do not constitute a limitation to the invention. In the drawings.

DETAILED DESCRIPTION

Exemplary embodiments of the present disclosure will be described in more detail below with reference to drawings. Although exemplary embodiments of the present disclosure are shown in drawings, it should be understood that the present disclosure can be implemented in various forms and should not be limited by the embodiments described herein. Conversely, these embodiments are provided to enable a more thorough understanding of the disclosure and to be able to fully communicate the scope of the disclosure to those skilled in the domain.

Embodiment 1

Figure 1:
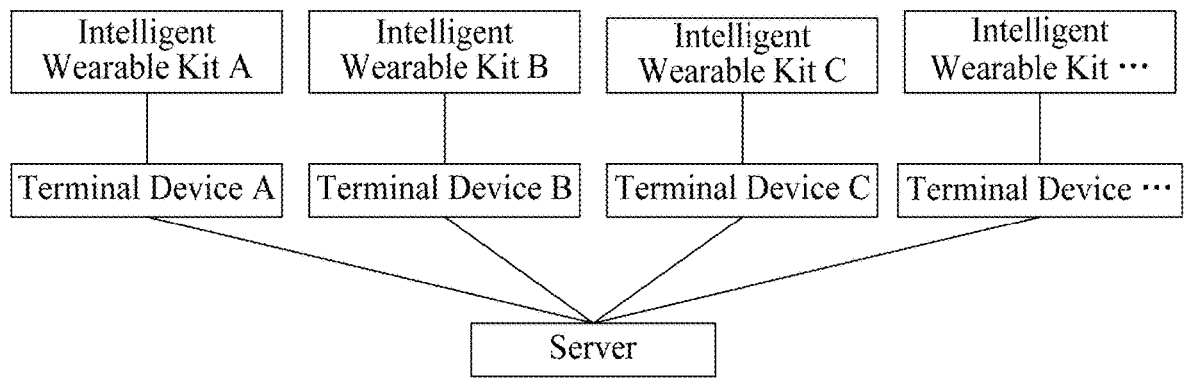
FIG. 1 is a schematic diagram of the risk analysis system provided in Embodiment 1 of the invention.

Embodiment 1 of the invention provides a risk analysis system, as shown in FIG. 1. The system can include at least one intelligent wearable kit, terminal device connected with the intelligent wearable kit, and server;

The intelligent wearable kit is used to collect at least one kind of the first risk information of user and send at least one kind of the first risk information to the connected terminal device;

The terminal device is used for sending the first risk information and statistics to server, and receiving risk analysis results sent by server;

The server is used to carry out risk analysis according to at least one of the first risk information and statistics, and send risk analysis results to the terminal device.

Among them, intelligent wearable kit in the embodiment of the invention includes one or more of the following intelligent wearable devices: intelligent gloves, intelligent protective clothing, intelligent shoes, intelligent elbow protection, intelligent knee protection, intelligent ankle protection, intelligent helmet, intelligent hard hat and intelligent glasses. The above intelligent wearable devices are worn on different parts of user's body when in use, It is used to collect risk information of different parts of the body through different functional modules set on it, so as to realize active protection. For example, the above intelligent wearable devices include: detection unit, processor unit, prompt unit and communication unit. The detection unit can include distance measuring sensor, acceleration sensor, gyroscope sensor, temperature and humidity sensor, harmful gas detection sensor, acoustic detection sensor, etc., which is used to detect the user's own motion information and/or relative motion information with surrounding objects in real time, and surrounding environment information. The processor unit is used to evaluate the risk of different parts of the user being injured by surrounding objects according to the information detected by the detection unit, and generate risk information of different parts, or to evaluate the user's posture risk according to the motion information detected by the detection unit, and generate the posture risk information. The above prompt unit is used to send corresponding prompt according to the above risk information; The above communication unit is used to send the above first risk information to the terminal device or server, etc. It should be noted that the embodiment of the invention is to send the above first risk information to terminal device, for example, to send the above first risk information to the terminal device connected to it in real time through Bluetooth unit in the intelligent wearable device.

Risk information detected by the same intelligent wearable kit wearing by the user is referred to as the first risk information in the embodiment of the invention. Of course, the first risk information in the embodiment can be different risk information mentioned above, such as struck-by risk, posture risk and environmental risk of different parts. The embodiment of the invention does not specifically limit this.

The above terminal device, which can be smart phones, smart bracelets, smart watches, etc., is used to pair with the above intelligent wearable kit. After the first risk information detected by intelligent wearable kit, it is sent to remote server through communication module in terminal device. For example, communication module in the terminal device can send the first risk information and statistics to server through Wi-Fi, 4G or 5G network, it can be in real time, or can be send to the server at a preset time interval. The embodiment of the invention does not specifically limit this.

The above server can be a server or a cluster server, can be a local server or a cloud server. The embodiment of the invention does not specifically limit this. The server analyzes the first risk information and statistics, and determines which risk should be highlighted or focused, which helps to provide effective early warning to users.

The above risk analysis system provided by the embodiment of the invention collects at least one kind of the first risk information from user through intelligent wearable kit, and sends the first risk information to the paired terminal device. Then the terminal device make statistics on the first risk information, and sends the first risk information and statistics to server. Server performs risk analysis, send risk analysis results to terminal device. The system provided by the embodiment of the invention obtains a large amount of risk information through collecting and analyzing of the first risk information, and then determines the results of risk analysis through comprehensive judgment of big data, so as to achieve differentiated treatment based on actual risk. Moreover, with the big data, we can comprehensively analyze crux or vulnerability of risk management, providing a basis for intelligent protection, intelligent management, specific control, etc.

In an optional embodiment, statistics of the above first risk information performed by the above terminal device can include: perform statistics of the first risk information according to the risk type, triggerring time of risk and/or risk level.

Among them, the above risk types can be divided according to body part, type of risk or environmental risk, such as hand static struck-by risk, hand dynamic stuck-by risk, head dynamic stuck-by risk, ergonomic risk, noise risk, high temperature risk, etc. When terminal device receives the first risk information sent by intelligent wearable kit, the first risk information is marked with a time tag. The above risk level is from the first risk information collected by the intelligent wear set, which can be zero risk, the first level risk, the second level risk, the third level risk, etc.

It should be noted that in the embodiment of the invention, statistics can be made according to any combination of any or more of the above risk types, triggerring time of risk and risk levels. For example, according to risk type, number and frequency for each risk type in the first risk information are collected; According to triggerring time of risk, number and frequency on triggerring time of risk in each time period of all the first risk information are collected. Or, according to the risk type and triggerring time of risk, number and frequency on each risk type are collected in each time period.

Of course, in the embodiment of the invention, the risk frequency and number of risk can also be calculated according to the collected first risk information. The above risk frequency can refer to frequency based on the first risk information sent by the same set of intelligent wearable kit, or refer to frequency based on the first risk information sent by the same intelligent wearable device, or refer to frequency of the first risk information of the same type. The number of risks mentioned above can be the number of all the first risk information, the number of risks of the same body part or the number of risks of the user corresponding to the same set of intelligent wearable kit.

In the embodiment of the invention, the above terminal device receives the first risk information sent by the paired intelligent wearable kit, and makes statistics on the first risk information, so as to realize the marking and statistics of a large number of first risk information, facilitate the server to read, and achieve rapid analysis and prediction.

Figure 2:
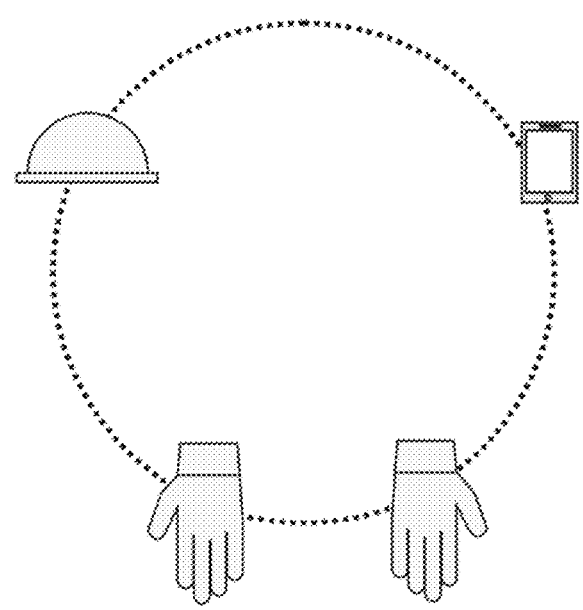
FIG. 2 is a schematic diagram on connection of smart gloves, smart hard hat and terminal device provided in Embodiment 1 of the invention.

For example, as shown in FIG. 2, intelligent wearable devices in an intelligent wearable kit include smart gloves and smart hard hat. The smart gloves and smart hard hat are connected to the terminal device through communication unit on them, such as Bluetooth, Zigbee technology, which will send the first risk information collected by smart gloves and smart hard hat to terminal device.

Specifically, intelligent gloves are equipped with distance measuring sensor, acceleration sensor, processor unit and communication unit. Distance measuring sensor is used to detect relative motion information between user's hand and objects around hand. Relative motion information can include the distance value between hand and objects around the hand, distance changing value and distance changing speed; Acceleration sensor is used to detect user's own motion information of hand, including the acceleration value and acceleration direction of hand motion. Motion state of hand can be determined according to the above acceleration value, which can be: static, stable motion and unstable motion; Motion direction of the hand can be determined by acceleration direction, which includes: single direction motion data and repeated multiple direction motion data. Processor unit is used to evaluate risk level of hand being hit by the surrounding objects according to detected own motion information and relative motion information, that is, the hand risk information. The more specific evaluation method can refer to the evaluation method in the existing technology, which will not be repeated here; Communication unit sends the hand risk information to terminal device.

Smart hard hat can be equipped with distance measuring sensor, acceleration sensor, gyroscope sensor, environmental monitoring sensors, processor unit, and communication unit. The detecting logic of the smart hard hat is hitting or hit by the surrounding objects is the same as the smart gloves, which will not be repeated here. The above gyroscope sensor is used to detect the user's own posture information. For example, three-axis gyroscope sensor can detect whether user is upright or stooping, and further analyze risk level of long-term injury to user's lumbar spine from the perspective of ergonomics, so as to send user a prompt for posture risk. The above environmental monitoring sensors can be used as a sound detection sensor (decibel meter) to detect decibel intensity in the surrounding environment, and then compare it with a preset threshold in the processor to finalize surrounding noise risk information.

In one example, referring to Table 1, terminal device A receives the first risk information from the connected intelligent wearable set A in a working day, and both terminal device A and intelligent wearable set A can be worn on an employee (user). The first risk information mentioned above is marked with the risk type, triggerring time of risk and number of risk.

After terminal device A makes statistics on the first risk information, it sends them to server in real time or at a preset time point. After server receives the first risk information and statistics, it carries out risk analysis. For example, as shown in Table 1, the hand static struck-by risk count during 7:00-8:00 is 2, the hand dynamic struck-by risk count is 1, and head dynamic struck-by risk count is 3; During 13:00-14:00, the risk count of hand static struck-by is 3, the risk count of hand dynamic struck-by is 1, the risk count of head dynamic struck-by is 1, count of ergonomics risk is 2, the count of noise risk is 1, etc.

In an optional embodiment, risk analysis is performed based on at least one first risk information, which can include:

Compare risk count for all types in a unit time duration with at least one preset threshold of the first number of risks, and determine the risk level for each time period according to the comparison results;

Rank risk count for all types in a unit time duration, and determine risk level for each time period according to the ranking results;

Compare risk count for different risk types with at least one preset threshold of the second number of risks, and determine the risk level for different risk types according to the comparison results; And/or, Rank risk count for different risk types, and determine risk level of risk types according to the ranking results.

Among them, the threshold of the first number of risks and the threshold of the second number of risks can be same or different. They can be multiple different thresholds or one threshold. In the embodiment of the invention, the number of risks of all types in a unit time is compared with the threshold of the first number of risks to determine that each time period belongs to a high-risk time period, a medium-risk time period or a low-risk time period. Or rank the number of risks of all types in a unit time, and determine the risk level of each time period according to the ranking result, which belongs to high risk time period, medium risk time period or low risk time period.

In the embodiment of the invention, risk count of different risk types in unit time can also be compared with threshold of the second number of risks, and the risk type can be determined as high risk, medium risk or low risk according to the comparison results; Or rank risk count of different risk types per unit time, and determine that the risk type belongs to high risk, medium risk or low risk according to the ranking results.

It should be noted that in this embodiment, risk analysis is carried out based on at least one first risk information and statistic, which can be any of the above four risk analysis, or the combination analysis of multiple risk analysis. The embodiment of this invention does not specifically limit this.

TABLE 1

| Risk Type (times) | Time (t) | | | | | | | | |
|---|---|---|---|---|---|---|---|---|---|
| | 7-8 | 8-9 | 9-10 | 11-12 | 12-13 | 13-14 | 14-15 | 15-16 | 16-17 |
| Hand Static Struck-By Risk | 2 | 3 | 4 | 0 | 1 | 3 | 4 | 4 | 1 |
| Hand Dynamic Struck-By Risk | 1 | 2 | 0 | 1 | 0 | 1 | 1 | 0 | 1 |
| Head Static Struck-By Risk | 3 | 4 | 5 | 1 | 0 | 1 | 3 | 0 | 2 |
| Ergonomic Risk | 1 | 0 | 1 | 1 | 0 | 2 | 1 | 2 | 1 |
| Noise Risk | 1 | 2 | 1 | 1 | 0 | 1 | 2 | 1 | 2 |

For example, if risk count is higher than 10 in a unit time duration, then it is determined as the high-risk time period; And/or, if risk count of any risk type is more than 8 in a unit time duration, then it is determined as the high-risk risk type.

Among them, the above threshold can be the same or different, and can also be adjusted according to actual situation.

For example, rank number of risks in different time periods, and determine the time period with the highest number of risks in the ranking results as the highest risk time period; Or, rank the risk count of different risk types, and determine the risk type with the most count in the ranking results as the highest risk.

Figure 3:
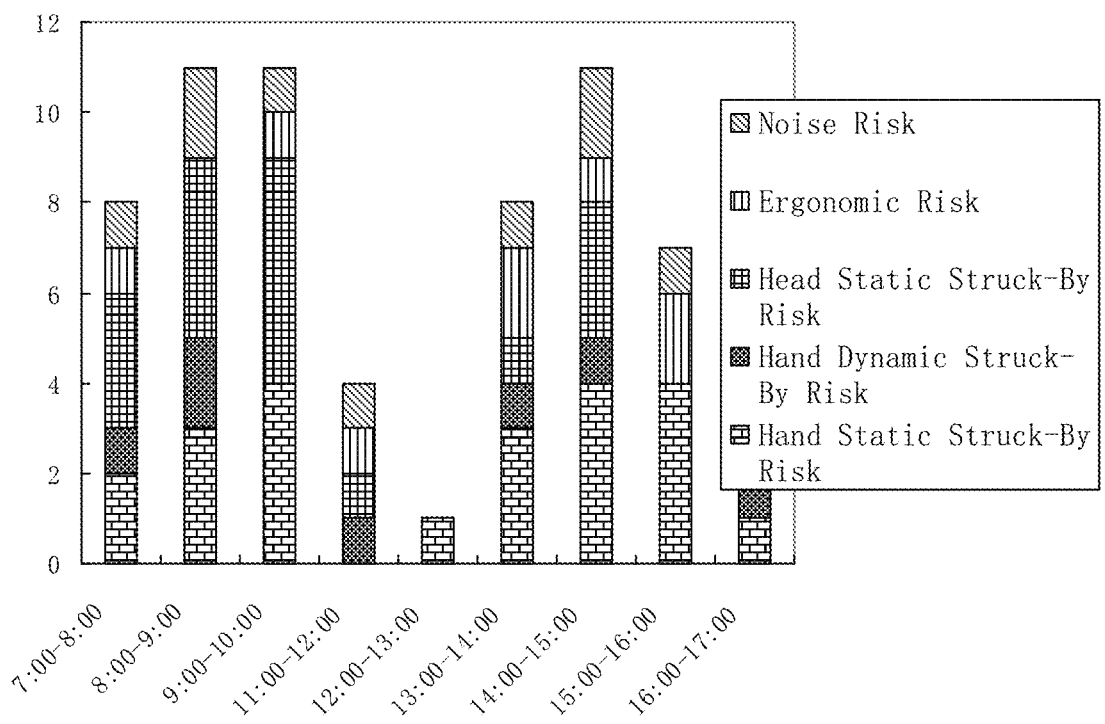
FIG. 3 is a columnar diagram of a risk example provided in Embodiment 1 of the invention.

In combination with the previous specific example, server can generate risk histogram shown in FIG. 3 based on the analysis of the first risk information provided by terminal device A, which can be displayed to management. If the threshold of the first risks is 10, it can be seen from the figure that the employee's 8:00-9:00, 9:00-10:00 and 14:00-15:00 are high-risk time periods; The main risk types are hand static struck-by risk and head static struck-by risk.

In an optional embodiment, the above terminal device is also used to receive or record the geographic location of the above intelligent wearable kit when receiving at least one kind of first risk information sent by the intelligent wearable kit, and send the geographic location to the above server;

The server is also used to determine the risk level of each region in each time period according to the geographical location, preset region, as well as the comparison results of number of all types of risk per unit time and at least one preset threshold of the third number of risk;

Determine risk level of each region in each time period according to geographical location and preset region, and the ranking results of all types of risk count per unit time;

Determine risk level of risk type for each region according to the geographical location, preset region, as well as the comparison result between number of different risk in unit time and at least one preset threshold of the fourth number of risk; And/or, Determine risk level of risk type for each region according to the geographical location, preset area, as well as the ranking results of number of risk of different type in unit time.

It should be noted that the above geographical location in this embodiment can be sent by positioning model in intelligent wearable kit to terminal device, or it can be obtained by positioning function in terminal device, which is not specifically limited in this embodiment. In this embodiment, the risk analysis is carried out according to the geographical location, preset area and analysis based on at least one first risk information and statistics, which can be any of the above four risk analysis, or the combination analysis of multiple risk analysis. The embodiment of this invention does not specifically limit this. The preset areas mentioned above can be divided equidistant according to the length and width of the working area, and can also be divided according to different assembly lines and working functions. The embodiments of the invention do not specifically limit this.

For example, according to the above geographical location and preset area, the area where the number of risks per unit time is higher than the preset threshold of the third number of risk is determined as a high-risk area; And/or, according to the above geographical location and preset area, risk type with the number of risks higher than the preset threshold of the fourth number of risk in unit time is determined as the high-risk type in the area. Among them, threshold of the third and fourth number of risk can be the same or different, and can also be adjusted according to the actual situation.

For example, according to the geographical location, preset area, area with the highest ranking of risk count per unit time is determined as the high-risk area; Or, according to the geographical location and preset area, risk type with the highest risk count is determined as the highest risk type in the area.

Figure 4:
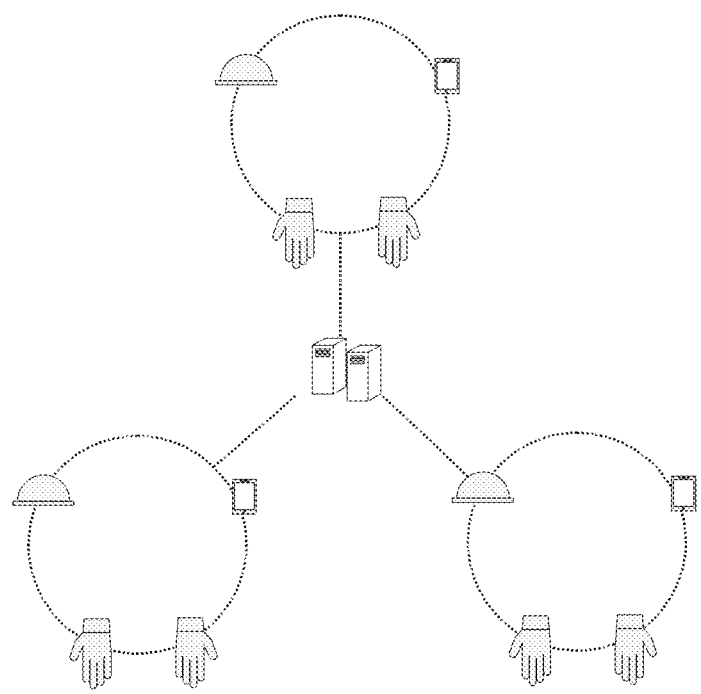
FIG. 4 is the schematic diagram of another risk analysis system provided in Embodiment 1 of the invention.
Figures 5, 6:
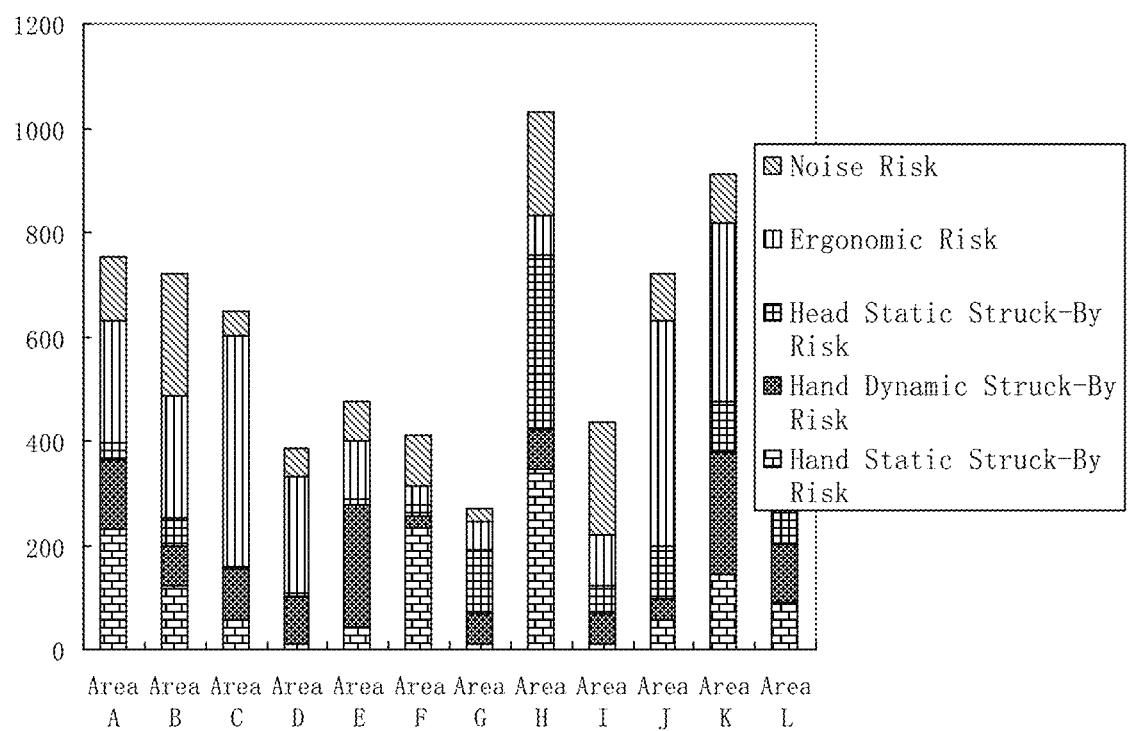
FIG. 5 is a schematic diagram of working area division provided in Embodiment 1 of the invention.
FIG. 6 is a columnar diagram of the number of risks in different areas provided in Embodiment 1 of the invention.

In another specific example, as shown in FIG. 4, intelligent wearable kit A, intelligent wearable kit B and intelligent wearable kit C are worn by three different employees, and terminal devices A, B and C are paired and connected with them respectively. As shown in FIG. 5, the working area of the above three employees is Area A-L. Table 2 is statistic on the above geographical locations, risk types and risk count within a month.

TABLE 2

| Count on type | Area Risk | | | | | | | | | | | |
|---|---|---|---|---|---|---|---|---|---|---|---|---|
| | A | B | C | D | E | F | G | H | I | J | K | L |
| Hand static struck-by risk | 231 | 121 | 56 | 12 | 45 | 234 | 12 | 345 | 12 | 56 | 143 | 89 |
| Hand dynamic struck-by risk | 132 | 76 | 98 | 90 | 234 | 23 | 56 | 78 | 56 | 43 | 234 | 111 |
| Head dynamic struck-by risk | 34 | 56 | 5 | 7 | 9 | 21 | 123 | 332 | 55 | 98 | 99 | 123 |
| Ergonomic risk | 234 | 232 | 444 | 222 | 111 | 34 | 55 | 78 | 98 | 435 | 342 | 125 |
| Noise Risk | 123 | 234 | 44 | 56 | 78 | 98 | 23 | 198 | 214 | 89 | 92 | 81 |

Figure 7:
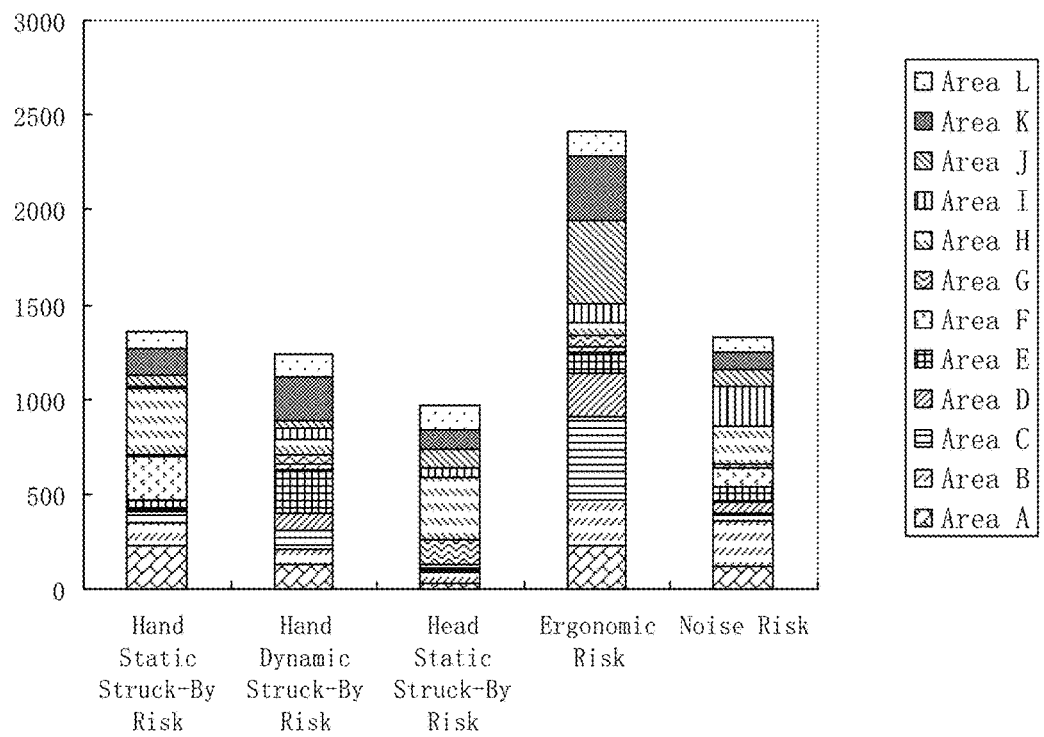
FIG. 7 is a columnar diagram of number of different type of risks of all types provided in Embodiment 1 of the invention.

Server performs comprehensive statistics based on the first risk information and statistics sent by multiple terminal devices, and generates a columnar schematic diagram as shown in FIG. 6 and FIG. 7, which can be displayed to the management. It can be seen from FIG. 6 that among all work areas, area H is the area with the highest number of risks, which can be set as a high-risk area. Users working in this area should be more alerted and reminded, or need more strict and in-depth risk control. Moreover, the risk of "hand static struck-by risk" is the most frequent in Region H, so Region H needs to carry out special control on "hand static struck-by risk", for example, management should strengthen hand static struck-by prevention training, or add hand static struck-by prevention tips. It can be seen from FIG. 7 that the "ergonomic risk" has the highest number in the whole work area, and special control is required for the "ergonomic risk" in the whole work area.

In an optional embodiment, terminal device is also used to receive or record the motion trail of intelligent wearable kit and send it to server;

Server is also used to associate and store the geographic location, the motion trail and the first risk information, and/or generate and display risk trail image.

It should be noted that the above motion trail in the embodiment of the invention can be sent by positioning model in intelligent wearable kit to terminal device, or it can be obtained from positioning function of the terminal device itself. This embodiment is not specifically limited.

Figure 8:
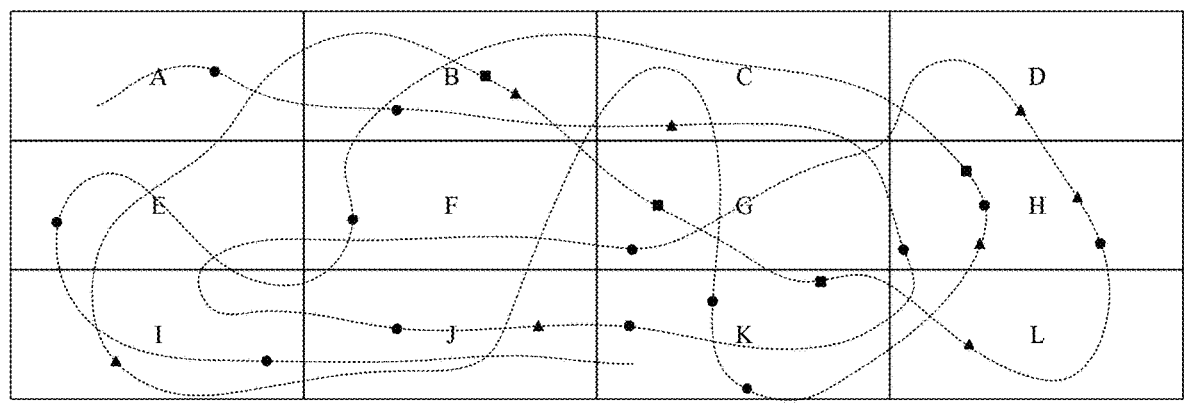
FIG. 8 is a schematic diagram of the combination of trail and risk information provided in Embodiment 1 of the invention.

In the embodiment of the invention, by associating and storing the geographic location, movement trail and the first risk information, the movement trail of a user and the first risk information in a certain area can be quickly queried and displayed to management intuitively. For example, referring to FIG. 8, the figure shows the movement trail of User A, the solid circle represents the static struck-by risk of hand, the solid triangle represents the dynamic struck-by risk of hand, and the solid square represents the ergonomic risk. The manager can quickly analyze movement trail of User A and risk in area from the above FIG. 8, In addition, it can establish a risk map of individual users in the whole work area or a risk map of all users in the whole work area to improve the efficiency of risk management.

In an optional embodiment, terminal device is also used to record working type of corresponding user of intelligent wearable kit;

Server is also used to carry out risk analysis according to type of work and the first risk information and statistics, and determine the risk profile of any specific type of work.

Among them, type of work can be divided according to the different working environment. For example, in a workshop of automobile manufacturing industry, type of work can be bench worker, sheet metal worker, mechanic, electrician, etc. Server can determine the risk profile of any specific type of work according to attributes of different types of work, which points out direction for different types of work to carry out different safety training, So as to differentiate risk control measures based on risk profile. For example, the risk analysis can be carried out for mechanic to determine the risk types and/or high-risk time period or area, and specific control can be carried out for the type of work, which improves control accuracy and efficiency.

In an optional embodiment, terminal device is also used to record other information of corresponding user of intelligent wearable kit; The other information includes any or a combination of the following information: using time of intelligent wearable kit, injury information of user and non-compliance behavior of user;

Server is also used for associate and storage the other information and the first risk information and statistics.

Among them, the using time of intelligent wearable kit refers to that when user starts wearing the intelligent wearable kit and it will be recorded through intelligent wearable set or terminal device, including the type of intelligent wearables and using time. The injury information of the user refers to details of the injury while wearing intelligent wearable kit as well as not wearing intelligent wearable kit during working process, which are recorded in server, providing the basis for establishing the user's personal risk profile; non-compliance behavior of user includes the information of the user's previous and current operational violation on requirements or procedures and whether there are any operational violation when being prompted by intelligent wearable kit. After recording these information, it provides basis for finding the crux.

The embodiment of the invention is to associate and store the other information of the above users with the first risk information and statistics, which provides a basis for establishing user's personal risk file. For example, using time of intelligent wearable kit can be used to calculate average using time for same type of work, so as to evaluate whether a user wear the intelligent wearable kit as per requirements, which not only provides a reference for daily risk management, but also provides a basis for determining responsibility or tracing the cause of the accident afterwards.

In an optional embodiment, terminal device is also used to record risk description of the first risk information when receiving at least one first risk information sent by intelligent wearable kit; Risk description includes any or more of the following information: reason for triggering the risk prompt, status of involved instruments and equipments, working environment and method to avoid the risk.

Server is also used for multi-dimensional analysis of the first risk information and statistics according to the risk description to determine the cause of the risk prompt; And/or, associate and store the risk description with the first risk information, and generate user risk record file or personal risk file.

In the embodiment of the invention, when intelligent wearable kit sends the first risk information to terminal device, the terminal device records extra information through the text input or voice input function in it, such as reason for triggering the risk prompt, status of involved instruments and equipment, working environment and method to avoid risk, Through multi-dimensional analysis of the first risk information, determine the final cause of the risk prompt; Or, after associating and storing these information with the first risk information, it provides a basis to establish personal risk files and trace back root cause of risks.

In an optional embodiment, server is also used to input at least one of the first risk information as a factor contributing the occurrence of accident into a selected machine learning model to predict the probability of occurrence of accident within the preset time period.

Among them, the machine learning model is obtained after training according to number of accidents and factors that affect the occurrence of accidents. For example, the machine learning model can be:

$$Y=b_0+b_1+X_1+b_2X_2+b_3X_3+\ldots+b_nX_n$$

Where, Y is number of accidents;

X1, X2, X3, ..., Xn are factors that affect occurrence of accidents, such as production (workload), number of operators, number of safety reports, number of risk information prompts, etc.

First of all, the embodiment of the invention can train the machine learning model based on a large amount of data (Xn, Y) to obtain the values of b0, b1, b2, ..., bn, so that the collected data can be used to calculate the probability of accidents in the next cycle, so as to better carry out risk management and control.

Figure 9:
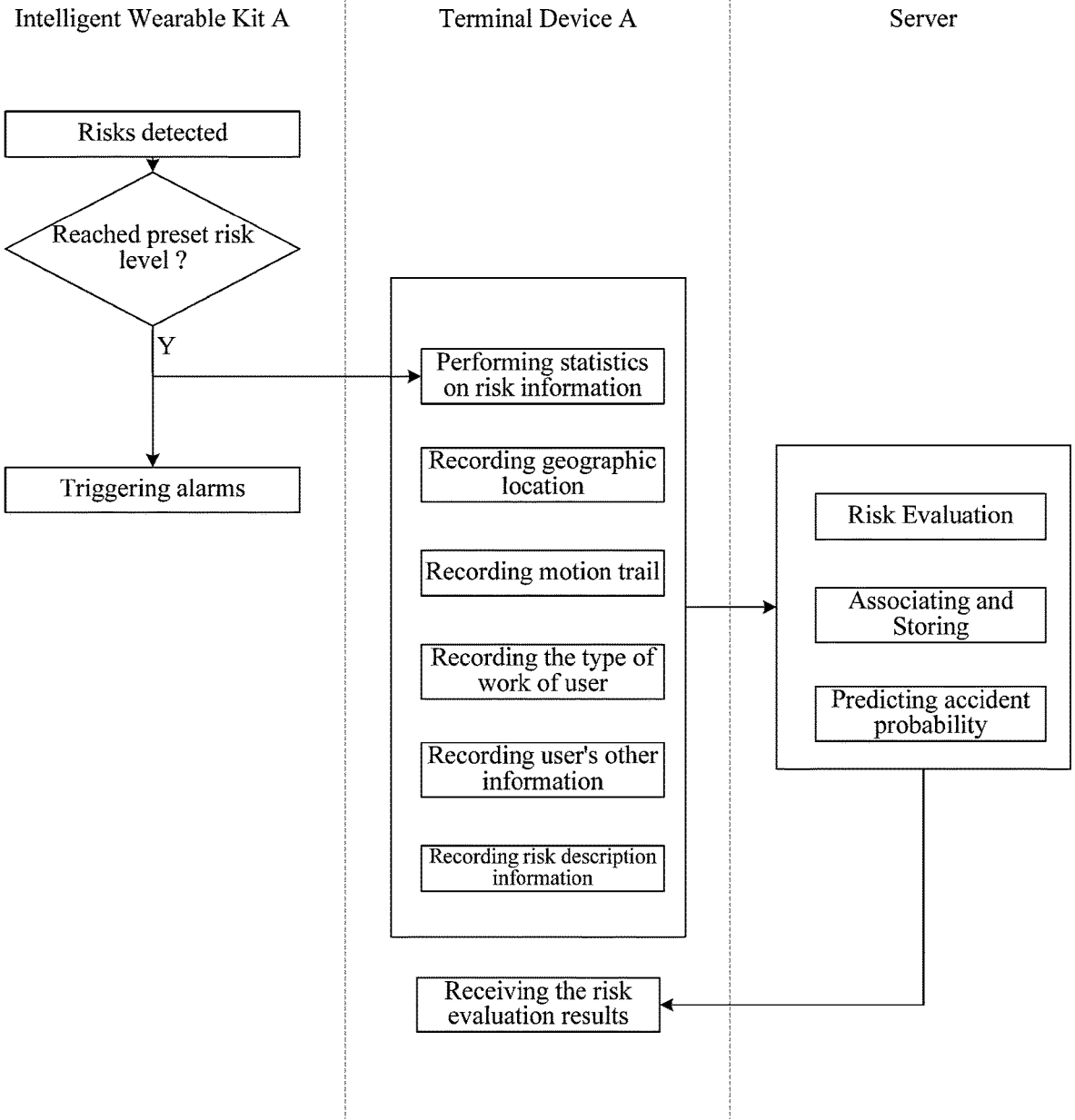
FIG. 9 is a schematic diagram of a specific risk analysis system provided in Embodiment 1 of the invention.

In another optional embodiment, as shown in FIG. 9, at least one kind of first risk information of user is collected through intelligent wearable kit, and the first risk information is sent to the paired connected terminal devices, such as intelligent wearable kit A and terminal device A. The terminal device A records a series of information such as geographical location, movement trail, type of work of user, user's other information and risk description, and then sends them to server, The server evaluates the risk and feeds back the evaluation results to the terminal device A, and predict and store of the accident probability, so that the management can control the risk and trace root cause of the risk.

Figure 10:
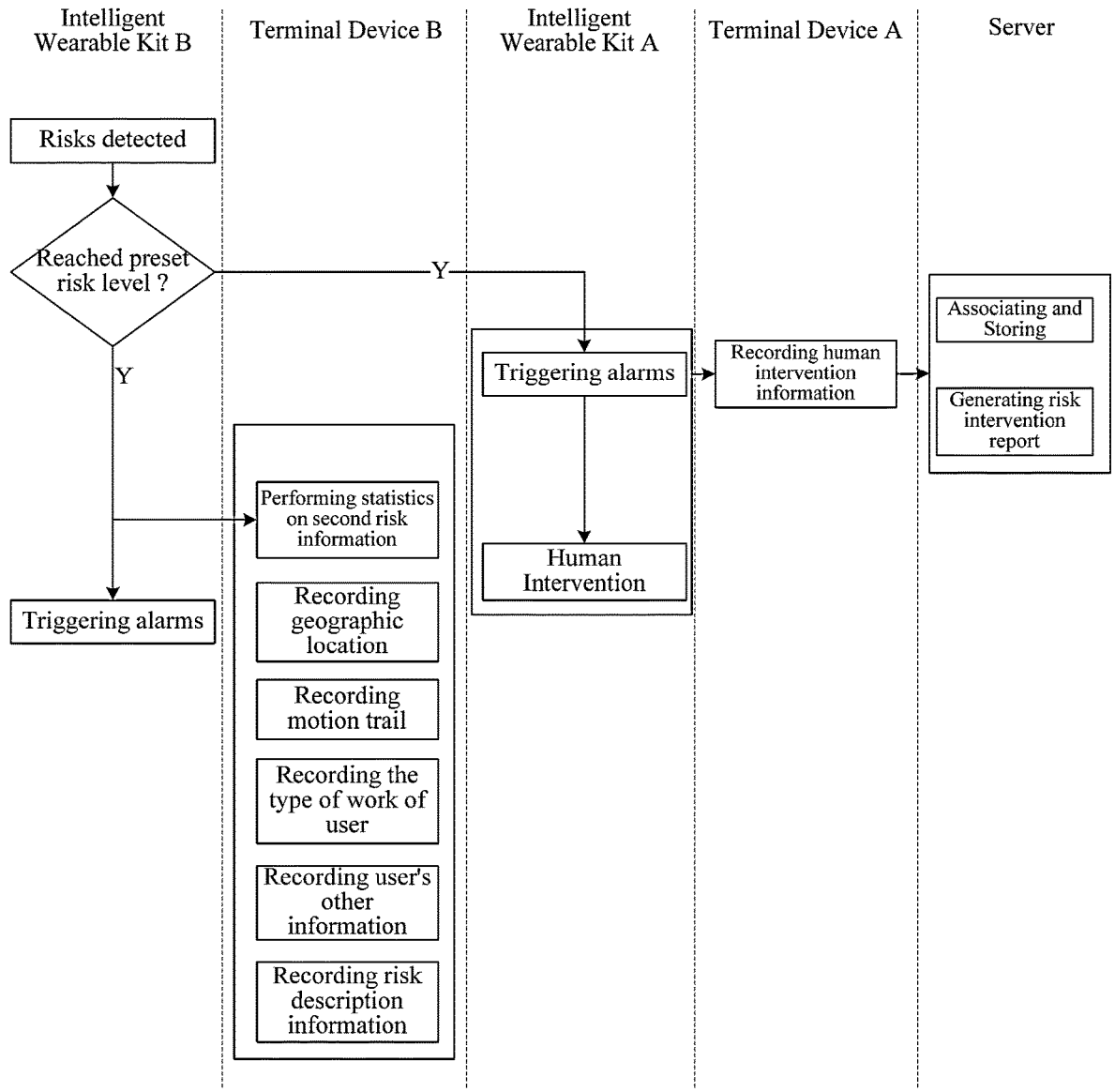
FIG. 10 is a schematic diagram of another specific risk analysis system provided in Embodiment 1 of the invention.

In an optional embodiment, as shown in FIG. 10, intelligent wearable kit is also used to receive at least one second risk information sent by other intelligent wearable kits, and send at least one second risk information to connected terminal device;

The terminal device is used to perform statistics on the second risk information and record human intervention, and send them to server.

The server is used to associate and store the second risk information, statistics and the human intervention information, and/or generate a risk intervention report based on the second risk information, statistics and the human intervention information.

For example, as shown in FIG. 10, after intelligent wearable kit B detects risk and reaches a preset risk level, it sends risk prompt/alarm to intelligent wearable kit A. If the user of the intelligent wearable kit B fails to react and avoid the risk in time due to noise or other reasons, the user of the intelligent wearable kit A makes human intervention to achieve the purpose of assisting in avoiding the risk, At the same time, the human intervention is recorded in the terminal device A. Of course, terminal device A can also record the risk location and risk type of intelligent wearable kit B, or take photos of the risk, and store these information in server. The server can also form a risk intervention report based on above information for later query or traceability. In the embodiment of the invention, intelligent wearable kit A and terminal device A are used by user A, and intelligent wearable kit B and terminal device B are used by user B. A threshold of the distance between the intelligent wearable kit A and the intelligent wearable kit B in the preset time period can be used as a condition to trigger recording the intervention; Or a threshold value of the distance between the terminal device A and the terminal device B in the preset time period can also be used as a condition to trigger recording the intervention. In the embodiment of the invention, intelligent wearable kit A detects the first risk information, and the intelligent wearable kit B detects the second risk information. For example, when the intelligent wearable kit A receive risk information from intelligent wearable B, within a preset time, the intelligent wearable kit A is close to the intelligent wearable kit B in distance, and if the distance of intelligent wearable A and B reached a preset value, then maintains and reaches a present time duration, then user A is considered having made human intervention; Or, if the intelligent wearable kit B detects risk, the distance of terminal device A and B reached a preset value, then maintains and reaches a present time duration, then user A is considered to have made human intervention.

The above risk analysis system provided by the invention collects at least one kind of risk information from user through intelligent wearable kit, and sends the risk information to paired terminal device. Then the terminal device performs statistical processing on the risk information, and sends the statistical risk information to server. The server performs risk analysis on the statistical risk information, and then sends the risk analysis results to terminal device. The purpose of the embodiment of the invention is to establish a HSE (Health, Safety, and Environment) management system. From HSE perspective, the invention improves risk identification, risk analysis and evaluation, risk control, risk management/supervision, etc., which can quickly identify risk crux, and provide targeted training for individuals or regions, So as to reduce risk and further save the cost of enterprise on safety management.

Based on the same inventive concept, the embodiment of the invention also provides a risk analysis method, which is applied to server and can include:

Obtain at least one first risk information and statistics;
Conduct risk analysis on at least one of the risk information and statistics, and determine the time period when risk count per unit time is higher than a preset threshold for the first number of risk as the high-risk time period; And/or, the risk type which risk count per unit time is higher than a preset second number of risk threshold is determined as high-risk risk type. The above risk information in this embodiment can be collected through intelligent wearable kit or other methods. The embodiment of this invention does not specifically limit this. The implementation of this method can refer to the implementation of the above system, and the repetition will not be repeated.

Embodiment 2

Figure 11:
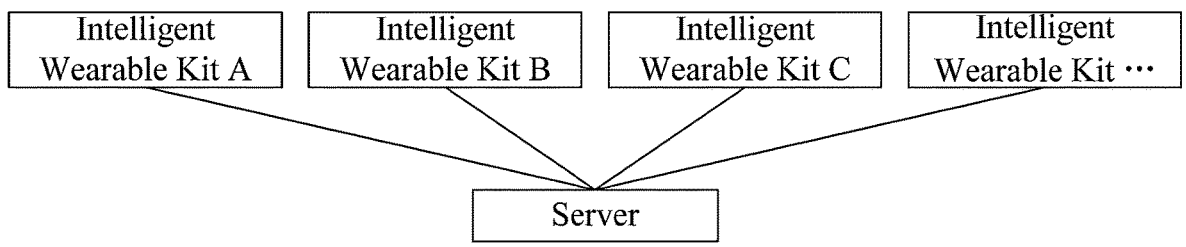
FIG. 11 is a schematic diagram of another risk analysis system provided in case 2 of the invention.

Embodiment 2 of the invention provides another risk analysis system, as shown in FIG. 11, which can include at least one intelligent wearable kit and server;

Intelligent wearable kit is used to collect at least one kind of risk information of users and send at least one kind of the risk information to server;

The server performs risk analysis based on at least one of the risk information.

It should be noted that in the embodiment of the invention, the above intelligent wearable kit directly sends the risk information to server. After the server makes statistics on the risk information, it carries out risk analysis based on the statistical risk information. The statistical process can refer to the statistical process of the terminal device in the above Embodiment 1. Just because there is no terminal device, there is no need to receive other information. For the detailed embodiment of the invention, refer to Embodiment 1, it will not be repeated here.

Those skilled people in the domain should understand that embodiments of the invention can be provided as methods, systems, or computer program products. Therefore, the invention can take form of complete hardware embodiments, complete software embodiments, or embodiments combining software and hardware. Furthermore, the present invention may take the form of computer program products implemented on one or more computer available storage media (including but not limited to disk memory, optical memory, etc.) containing computer available program codes.

The present invention is described with reference to the flow chart and/or block diagram of the method, equipment (system), and computer program product according to the embodiment of the present invention. It should be understood that each flow and/or block in the flow chart and/or block diagram and the combination of flow and/or block in the flow chart and/or block diagram can be materialized by computer program instructions. These computer program instructions can be provided to the processors of general-purpose computers, special-purpose computers, embedded processors or other programmable data processing devices to generate a machine so that the instructions executed by the processors of computers or other programmable data processing devices generate devices for realizing the functions specified in one or more processes and/or one or more blocks of a flowchart.

These computer program instructions can also be stored in the computer-readable memory that can guide the computer or other programmable data processing equipment to work in a specific way, so that the instructions stored in the computer-readable memory produce a product including an instruction device, and the device implements the functions specified in one or more flows and/or one or more blocks of the flowchart.

These computer program instructions can also be loaded onto a computer or other programmable data processing device to enable a series of operation steps to be performed on the computer or other programmable device to generate computer-realized processing, so that the instructions executed on the computer or other programmable device provide steps for realizing the functions specified in one or more processes and/or one or more blocks of the flowchart.

Obviously, those skilled people in the domain can make various changes and variations to the invention without departing from the spirit and scope of the invention. Thus, if these modifications and variations of the invention fall within the scope of the claims of the invention and its equivalent technology, the invention is also intended to include these modifications and variations.

What is claimed is:

1. A risk analysis system characterized by comprising: at least one intelligent wearable kit, a terminal device connected with the intelligent wearable kit, and a server; wherein,
   the intelligent wearable kit is used for collecting at least one kind of first risk information of user, and sending at least one kind of the first risk information to the connected terminal device;
   the terminal device is used for performing statistics on the first risk information according to risk types, triggering time of risk and/or risk levels of the first risk information, sending the statistical first risk information to the server, and receiving a risk analysis results sent by server;
   the server is used for performing risk analysis according to at least one kind of the statistical first risk information, and sending the risk analysis results to the terminal device;
   wherein performing risk analysis according to at least one kind of the statistical first risk information comprises:
   comparing risk count for all types per unit time with at least one preset threshold of the first number of risks, and determining the risk levels for each time period according to the comparing results;
   ranking risk count for all types per unit time, and determining the risk levels for each time period according to the ranking results;
   comparing risk count for different risk types per unit time with at least one preset threshold of the second number of risks, and determining the risk levels of the risk types according to the comparing results; and/or,
   ranking risk count for different risk types per unit time, and determining the risk levels of the risk types according to the ranking results.

2. The system as claimed in claim 1, characterized in that the terminal device is further used for receiving or recording geographic location of the intelligent wearable kit, and sending the geographic location to the server, while receiving at least one kind of the first risk information sent by the intelligent wearable kit;
   the server is further used for determining the risk levels of each region in each time period according to the geographical location and preset region, and the comparing results of risk count for all types per unit time with at least one preset threshold of the third number of risks;
   determining the risk levels of each region in each time period according to the geographical location and preset region, and the ranking results of risk count for all types per unit time;
   determining the risk levels of the risk types of each region according to the geographical location and preset region, and the comparing results of risk count for different risk types per unit time with at least one preset threshold of the fourth number of risks; and/or,
   determining the risk levels of the risk types of each region according to the geographical location and preset region, and the ranking results of risk count for different risk types per unit time.

3. The system as claimed in claim 1, characterized in that the terminal device is further used for receiving or recording a motion trail of the intelligent wearable kit, and sending it to server; the server is further used for associating and storing the geographic location, the motion trail and the first risk information, and/or generating and displaying the risk trail image.

4. The system as claimed in claim 1, characterized in that the terminal device is further used for recording the working type information of corresponding user of intelligent wearable kit;
   the server is further used for carrying out risk analysis according to the working type information and the statistical first risk information, and determining the risk analysis results of the specific type of work.

5. The system as claimed in claim 1, characterized in that the terminal device is further used for recording other information of the corresponding user of intelligent wearable kit; the other information includes any or more of the following information:
   the using time of the intelligent wearable kit, injury information of user and non-compliance behavior of user;
   the server is further used for associating and storing according to the other information and the statistical first risk information.

6. The system as claimed in claim 1, characterized in that the terminal device is further used for recording risk description of the first risk information, while receiving at least one kind of the first risk information sent by the intelligent wearable kit; the risk description includes any or more of the following information: reason for triggering the risk prompt, status of involved instruments and equipments, working environment and method to avoid the risk;
   the server is further used for performing the multi-dimensional analysis of the statistical first risk information according to the risk description, to determine the reason of the risk prompt; and/or,
   associating and storing the risk description with the first risk information.

7. The system as claimed in claim 1, characterized in that the intelligent wearable kit is further used for receiving at least one kind of the second risk information sent by other intelligent wearable kits, and sending at least one kind of the second risk information to the connected terminal device;
   the terminal device is used for performing statistics on the second risk information and recording human intervention information, and sending the statistical second risk information and the human intervention information to the server;
   the server is used for associating and storing the statistical second risk information and the human intervention information, and/or generating a risk intervention report according to the statistical second risk information and the human intervention information.

8. The system as claimed in claim 1, characterized in that the server is further used for inputting at least one kind of the first risk information as a factor contributing the occurrence of accident into a selected machine learning model, to predict the probability of occurrence of accident within the preset time period.

9. A risk analysis method applied to server characterized by comprising:
   obtaining at least one of statistical first risk information according to risk types, triggering time of risk and/or risk levels of first risk information;
   performing risk analysis on at least one of the statistical first risk information;
   comparing risk count for all types per unit time with at least one preset threshold of the first number of risks, and determining the risk levels for each time period according to the comparing results;
   ranking risk count for all types per unit time, and determining the risk levels for each time period according to the ranking results;
   comparing risk count for different risk types per unit time with at least one preset threshold of the second number of risks, and determining the risk levels of the risk types according to the comparing results; and/or,
   ranking risk count for different risk types per unit time, and determining the risk levels of the risk types according to the ranking results.

* * * * *